United States Patent [19]
Levien

[11] Patent Number: 5,991,513
[45] Date of Patent: Nov. 23, 1999

[54] METHOD AND APPARATUS FOR SUPPRESSING MOIRÉ PATTERNS

[76] Inventor: Raphael L Levien, 1984 El Dorado Ave., Berkeley, Calif. 94707

[21] Appl. No.: 08/941,338

[22] Filed: Sep. 30, 1997

[51] Int. Cl.[6] .............................. G06J 5/50; G06K 9/40; G06K 9/44; H04N 1/405; H04N 1/409

[52] U.S. Cl. .................. 395/109; 382/237; 382/264; 382/275; 358/450; 358/454; 358/456

[58] Field of Search ............................. 395/109; 382/237, 382/270, 264, 275; 358/533, 534, 535, 536, 454, 456, 457, 458, 466, 298, 463, 450

[56] References Cited

U.S. PATENT DOCUMENTS

| | | |
|---|---|---|
| 4,032,978 | 6/1977 | Wong . |
| 4,142,462 | 3/1979 | Gilmore . |
| 4,188,225 | 2/1980 | Liu . |
| 4,217,822 | 8/1980 | Milligan . |
| 4,278,755 | 7/1981 | Liu . |
| 4,336,558 | 6/1982 | Lew . |
| 4,611,349 | 9/1986 | Hou . |
| 4,633,327 | 12/1986 | Roetling . |
| 4,673,971 | 6/1987 | Ikuta et al. . |
| 4,758,886 | 7/1988 | Rylander . |
| 4,786,975 | 11/1988 | Postl . |
| 4,821,334 | 4/1989 | Ogino et al. . |
| 4,903,123 | 2/1990 | Kawamura et al. . |
| 4,916,545 | 4/1990 | Granger . |
| 4,926,267 | 5/1990 | Shu et al. . |
| 4,942,480 | 7/1990 | Shu . |
| 4,977,458 | 12/1990 | Granger et al. . |
| 4,987,496 | 1/1991 | Greivenkamp, Jr. . |
| 5,109,282 | 4/1992 | Peli . |
| 5,243,443 | 9/1993 | Eschbach . |
| 5,274,473 | 12/1993 | Kidd et al. . |
| 5,277,895 | 1/1994 | Carleback . |
| 5,313,309 | 5/1994 | Tai et al. . |
| 5,337,162 | 8/1994 | Sakano . |
| 5,381,247 | 1/1995 | Hains . |
| 5,408,337 | 4/1995 | Kanda . |
| 5,422,742 | 6/1995 | Ostromoukhou et al. . |
| 5,426,519 | 6/1995 | Banton . |
| 5,463,471 | 10/1995 | Chou . |
| 5,477,305 | 12/1995 | Parker et al. . |
| 5,493,416 | 2/1996 | Fan . |
| 5,526,445 | 6/1996 | Smutek et al. . |
| 5,543,941 | 8/1996 | Parker et al. . |
| 5,548,407 | 8/1996 | von Kienlin et al. . |
| 5,572,600 | 11/1996 | Tajima et al. . |
| 5,587,811 | 12/1996 | Liguori . |
| 5,668,638 | 9/1997 | Knox . |
| 5,680,222 | 10/1997 | Ashworth . |

*Primary Examiner*—Scott Rogers
*Attorney, Agent, or Firm*—Allan Jacobson

[57] ABSTRACT

A halftone screening method includes a method of moiré suppression, in which the input image is first screened in a trial screening module. The input image is then subtracted from the trial screened image to produce an error image which contains both the trial screen pattern and the moiré pattern introduced by the trial screening process. The error image is filtered in a lowpass filter to remove the trial screen pattern, leaving only the moiré pattern, which is then subtracted from the input image to produce a compensated image. Finally, the compensated image is then screened in a final screening module. The moiré image component of the compensated image tends to cancel the moiré pattern introduced by the final screening module so as to suppress moiré patterns in the final screened image. In two alternate embodiments, filter refinements are provided to reduce grayscale distortions and improve moiré suppression in the extreme light and shadow regions of the image.

53 Claims, 4 Drawing Sheets

METHOD AND APPARATUS FOR SUPPRESSING MOIRÉ PATTERNS

FIELD OF THE INVENTION

The present invention relates to the field of image processing, and more particularly, the present invention relates to the field of halftone screening of photographic images using improved methods and apparatus.

BACKGROUND OF THE INVENTION

Halftone screening is a process by which shades of gray can be represented in images formed with a bi-level marking system, such as black ink on white paper. As is the case in most printing systems, whether color or black and white, the absence or presence of the ink on the paper is used to represent the printed image. In order to represent halftones (shades between the presence or absence of the printed ink), the original image is screened to produce a pattern, made up of variable size dots, which appear to the human eye as a halftone image. Thus to prepare a photograph for printing, it is necessary to perform the process of halftone screening, which converts the continuous gray shades of the original into dots of varying size and shape.

Originally, photomechanical screening systems used physical photographic screens. In computer based screening systems, images are typically stored in a memory by representing tone values for each pixel of the original image. For a black and white image, the stored pixels represent the grayscale value corresponding to each pixel. For a color image, each color plane is stored as an array of pixels each representing the tone value for each pixel of the image in each respective color plane. For example, if each of the pixels of a black and white image is represented by an 8 bit digital word, then the tone value for a given image pixel is one of 256 values between the black level and the white level, with 0 corresponding to white and all ones (or 255), corresponding to black.

Digital screening devices and digital raster scan printing devices simulate the generation of a halftone cell to produce a screened image. The most common form of digital screening is to generate a repeating spot function corresponding to the halftone cell, and compare each pixel of the grayscale image with a corresponding pixel in the repeating spot function. The period and angle of the repeating spot function correspond to that of the resulting grid of dots, while the shape of the surface defined by a single repeating halftone cell spot function determines the shape of the resulting dots for each shade of gray.

There are also many screening methods that make use of a screen pattern cell, which can be a one dimensional strip. a band, or any two dimensional area, such as a square, that contains a section of the final screen spanning more than one halftone cell. The screening method will repeatedly generate the screen pattern cell, resulting in a final screen of the desired ruling and angle. The critical step in halftone screening is the generation of the screen pattern cell which will be repeated to form the final screen covering the entire input image area. Examples of prior art techniques include rational tangent (U.S. Pat. No. 4,149,194 to Holladay), rational supercell (European patent document 0 427 380 $A_2$, corresponding to U.S. Pat. No. 5,235,435), irrational tangent (U.S. Pat. Nos. 4,499,489 to Gall et al, and 4,350,996 to Rosenfeld). In addition, three alternative screening techniques described in three patents by the inventor of the present invention, namely U.S. Pat. No. 5,291,310, U.S. Pat. No. 5,307,181, and U.S. Pat. No. 5,315,406, may each be used to generate a suitable screen pattern cell.

Digital halftone screening consists of first generating a spot function or screen pattern cell. The spot function is usually stored as a fairly small pattern that repeats itself or is repeatedly generated by programming, At any point where the original image is greater than the spot function, the output is marked. At any point where the image is not greater than the spot function, the output is not marked. In other words, if the value of the image pixel is greater than corresponding value of the spot function, a mark is generated by the marking engine, whereas if the value of the image pixel is less or equal to the spot function value, then no mark is generated by the marking engine, or vice versa. In this way, the final screened image, composed of dots, is produced. In color printing, there are four separate steps of halftone screening, one each for the cyan, magenta, yellow, and black inks.

Much prior art work has been devoted to producing screens which will produce good results and avoid artifacts in the final image. One such artifact to be avoided is the moiré pattern. There are a number of sources of moiré in the halftoning process. One source of moiré is the moiré between the screen girds used for the different ink planes in a color image. To counteract the tendency for moiré patterns to result, color screens are angled at 0 (yellow), 15 (cyan), 75 (magenta) and 45 degrees (black). If these angles are adhered to precisely, as well as the screen ruling being precisely identical for all four planes, then optimum results (minimum moiré) are achieved. Screening at these angles in photomechanical screening systems is achieved by rotating the photographic screen carriers. In digital screening devices and digital raster scan imaging devices, however, there is some difficulty in exactly reproducing irrational numbers, such as the tangent of 15 degrees or the tangent of 75 degrees. (Rational numbers can be represented as the ratio of two integers; irrational numbers are endless non-repeating decimals). Both rational tangent, and irrational tangent digital screening systems are known.

In general, the use of a repeating spot function, or screen pattern cell, for screening does work, and is used for the overwhelming majority of printing today. Aside from simplicity of implementation, the great strength of a repeating spot function, is its ability to render areas of constant or smoothly varying gray value. Many attempts to improve various aspects of the halftoning process (including error diffusion and so-called "stochastic" techniques) abandon the precise repetition of identically shaped dots, thereby introducing a grainy appearance.

Nonetheless, the quest for the highest quality image continues. Traditional halftoning techniques suffer from one persistent problem, that of unwanted moiré patterns caused by the interference between patterns in the original grayscale image and the generated spot function, which could be called subject moiré. (A different source of artifacts in digital raster scan screening systems is screener induced moiré, which results from the interaction between the screen and the finite resolution of the output image forming device). Screener induced moiré artifacts are more pronounced when using fine screen rulings, low output resolutions, or a combination of both. As a result, it is typical to use a 3500 dot per inch (dpi) output resolution to minimize screener induced moiré artifacts and obtain a quality image.

SUMMARY OF THE INVENTION

The present invention is embodied in a method and apparatus for suppressing subject moiré artifacts by compensating for predicted moiré patterns. First, the moiré pattern which results from screening is predicted. Then the predicted moiré is combined with the original image to produce a compensated image, which compensated image is then screened. The moiré pattern created by screening tends to be canceled by the predicted moiré in the final halftone image. The effect is to suppress or cancel the moiré patterns which are introduced by the halftone screening process.

To predict a moiré pattern, a trial screen is made, using the unmodified halftone process. Then the original image is subtracted from the trial screen to produce an error image corresponding to the moiré pattern. The error image is filtered to extract the moiré signal only, The extracted moiré signal is subtracted from the original grayscale image, to produce an image with a correction factor. Finally, the image with the correction factor is screened, producing the final halftone. Since the correction factor is derived from a negative image of the moiré image, it tends to cancel the moiré patterns introduced by the halftone screening process.

In addition, the present invention includes refinements which correct for undesirable grayscale distortions introduced into the compensated image, improve rendition of whites and blacks, and increase the effectiveness of the suppression of moiré in regions adjacent to solid black and white regions.

DETAILED DESCRIPTION

Figure 1:
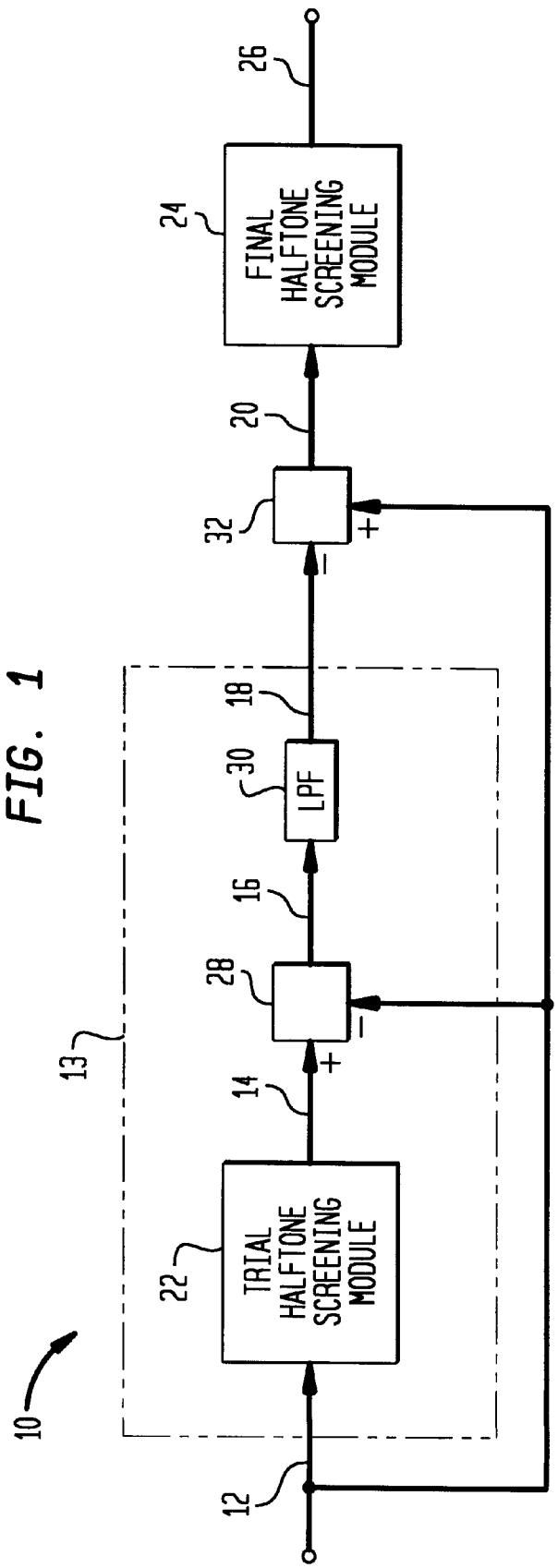
FIG. 1 is a block diagram of a halftone screening system for suppressing moiré patterns in accordance with the present invention.

A halftone screening system 10 in accordance with the present invention is shown in FIG. 1. The system 10 includes a first halftone screening module 22 for generating a trial halftone screened image. a first adder 28, a lowpass filter (LPF) 30. a second adder 32, and a second halftone screening module 24 for generating a final halftone screened image. The trial screening module 22 and the final screening module 24 use substantially the same screening method so that each will tend to produce substantially the same moiré pattern in the respective output. for substantially the same input image.

The first and second adders 28, 32. perform signed addition, and as actually used in the figures, perform subtraction to compute the difference between two inputs. In particular, the first adder 28 subtracts the input image 12 from the screened image output 14 from the trial screening module 22, which is then filtered in a lowpass filter 30. The second adder 32 subtracts the output of the lowpass filter 30 from the original image 12 to produce a compensated image 20. The compensated image 20 is screened in the final halftone screening module 24.

As used herein, terms are defined as follows:

"Image pixels" shall mean the grayscale values for an input grayscale image to be screened.

"Screen pixels" shall mean the individual pixels corresponding to the marking signals to the marking device, which term is also equivalent to the term "output pixels".

"Spot function" shall mean a function of grayscale values corresponding to each screen pixel of an output pixel array.

"Halftone cell" shall mean the output pixel array of screen pixels corresponding to the spot function. The halftone cell also corresponds to the array in which a halftone dot is formed. The halftone dot is formed by applying the spot function to the corresponding input image pixels.

"Screen pattern" shall mean an array of halftone cells arranged on a regular grid.

"Screen pattern cell" a two dimensional area that contains a section of a screen pattern spanning more than one halftone cell.

A "halftone". a "halftone screened image" or a "screened image" is an image formed by halftone dots of various sizes so as to give the effect of a continuous tone when viewed at normal reading distance, The input 12 to the screening process is an original grayscale image, wherein each image pixel represents the tone value for each pixel of the image in each respective color plane. The output pixels 26 from the screening process are coupled to the marking device to form the resulting halftone image.

The first step is to produce a trial halftone screened image 14 of the original image 12. There are many methods for producing the trial halftone screened image. The present invention may be used with many such prior art screening methods. The trial halftone image 14 and be analyzed into three components: the original input image, the screen pattern (generated internally to the trial screening module 22), and unwanted moiré.

The second step is to subtract 28 the original image 12 from the trial screened image 14. To subtract a grayscale image 12 from a bi-level screened image 14. each grayscale pixel is subtracted from each screen pixel. The difference between the input image 12 and the trial screened image 14 is an error image 16. Since the original image 12 has been subtracted from the trial screened image 14, the error image 16 contains only two components: the screen pattern and the moiré pattern.

The third step is to lowpass filter 30 the error image 16, resulting in a moiré image 18. The trial screening module 22. adder 28 and LPF 30 form a moiré prediction module 13. by which the moiré pattern which would result from halftone screening an input image 12 is predicted. The predicted moiré image 18 is used to generate a correction factor to the original input image 12.

In theory, the screen pattern consists only of high spatial frequencies, and the moiré only of low spatial frequencies, so all of the screen pattern is effectively filtered out by LPF 30, leaving only the moiré. In practice, the lowpass filter 30 must be a bit "leaky". allowing some of the screen pattern to leak through, and attenuating some of the moiré signal. However, the practical considerations of leaky lowpass filters is discussed below in connection with two lowpass filter refinements.

The fourth step is to subtract the moiré image 18 (the correction factor) from the original grayscale image 12 in adder 32, giving an output image 20 with correction factor. The final step is to halftone screen the image 20 with the correction factor, giving a final halftone 26. The theory is that the moiré generated by the image 20 with correction factor in the final halftone screening module 24, will be similar or identical to the moiré generated in the trial screening module 22, the latter of which is captured in the correction signal, so that the final halftone moiré and the correction factor will cancel each other, producing an image with reduced moiré.

First Refinement:
A Modified Spot Function to Reduce Grayscale Distortion

As indicated, for an ideal system in accordance with FIG. 1, the trial screening module 22 and the final screening module 24 use substantially the same screening method. In one embodiment, the trial screening module 22, and the final halftone screening module 24, use different spot functions.

In general, matching the grayscale exactly for the trial and final screens is possible only when the system satisfies a given constraint: that as the shade of gray presented at the input image grows darker, the grayscale value presented at the input to the final screen, measured at the locations of the edges of the dots as produced by the final halftone screen, must grow darker as well. Because the given constraint states that a signal must increase monotonically in response to increasing the input gray value, the given constraint is often termed the monotonicity constraint. The monotonicity constraint becomes easier to satisfy as the cutoff frequency of the lowpass filter becomes smaller. If the monotonicity constraint is not satisfied, the consequence is an inability to faithfully reproduce image detail in extreme highlight and shadow regions (i.e. very light and very dark grays).

Yet, if the cutoff frequency becomes too low, the risk is that the filter will attenuate the higher frequencies of the moiré signal, rendering the suppression of moiré less effective. Further, as the cutoff frequency decreases, the support of the filter grows in size, increasing the likelihood of artifacts.

However, the lowpass filter 30 must be leaky. Even if its spectral response were carefully optimized to completely suppress the screen frequencies, such optimization would increase the extent of the filter and possibly exhibit a "ringing" effect, which would be noticeable as artifacts in the final halftone image. Yet, the leakiness of the filter will produce artifacts of its own, most notably a distortion of the grayscale as reproduced by the system.

It is desirable to provide a spot function for the final halftone screening module 24 which is different from the spot function for the trial screening module 22, so as to correct for the distortion of the grayscale introduced into the compensated image. By way of example, for flat shades of gray in FIGS. 2A–2F. the modified spot function must be such that the final halftone 26 is as identical as possible to that produced by trial screening module, i.e., the same as produced by traditional techniques.

Figure 2A:
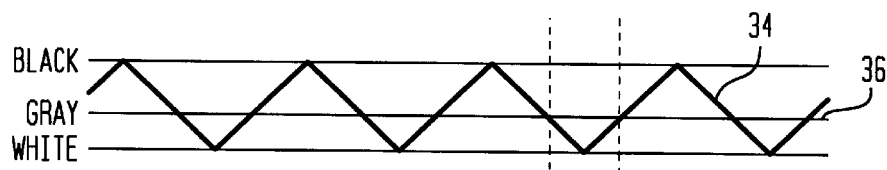
FIG. 2A is an illustration of a spot function used for screening a grayscale image used in conjunction with the present invention.

The input image 36 in FIG. 2A consists of a constant shade of gray. No moiré results from halftoning a constant shade image. Even so, it is desired that the grayshade of the final halftone (FIG. 2F) resembles that of the trial halftone (FIG. 2B) as closely as possible. The grayscale distortion results from the fact that the image with a correction factor consists of a constant with an attenuated "carrier wave" function corresponding to the spot function.

The screening of a constant shade of gray is illustrated in FIGS. 2A–2F, for a one-dimensional variant of the process.

Figure 2B:
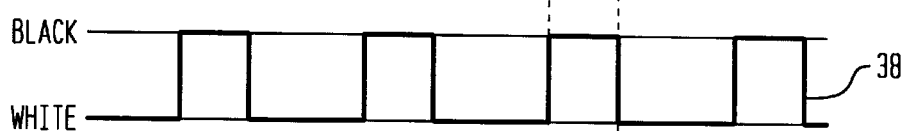
FIG. 2B is a representation of a trial image used in conjunction with the present invention.
Figure 2C:
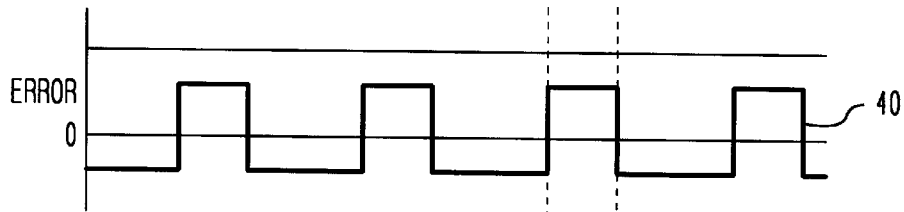
FIG. 2C is a representation of an error image generated in accordance with the present invention.
Figure 2D:
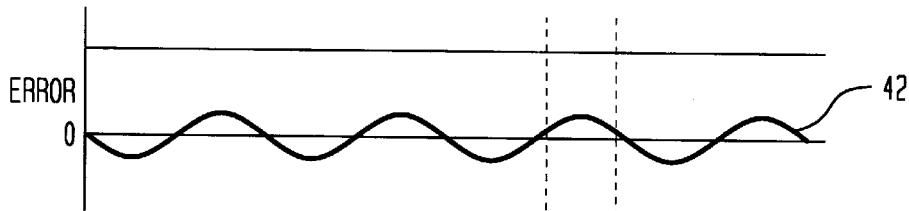
FIG. 2D is a representation of a predicted moiré image generated in accordance with the present invention.
Figure 2E:
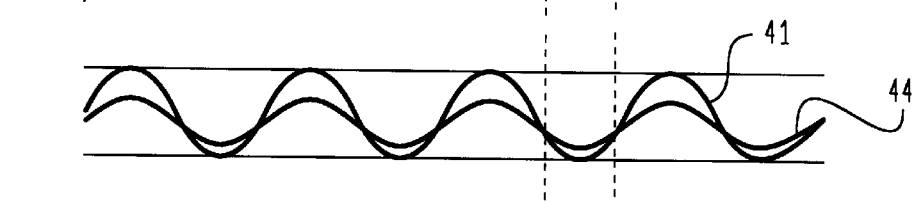
FIG. 2E is an illustration of a compensated grayscale image and a modified spot function in accordance with the present invention.
Figure 2F:
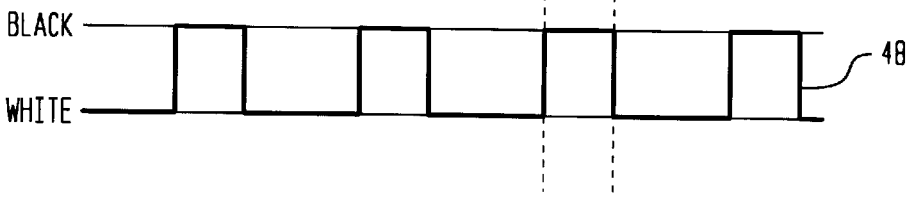
FIG. 2F is an illustration of a final halftone image in accordance with the present invention.

FIG. 2A shows the original grayscale image 36 superimposed with a spot function 34. FIG. 2B shows the resulting trial halftone 38. FIG. 2C shows the error image 40 after subtracting the original image 36 from the trial halftone 38. FIG. 2D shows the moiré image 42 at the output of the lowpass filter. FIG. 2E shows the compensated image 44 which is input to the final halftone screening module. Finally, FIG. 2F shows the resulting final halftone.

The input to the final halftone screening module 44 contains the added carrier wave signal 42. Had the final halftone screening module used the same spot function 34 of the trial screening module, then the grayscale of the final halftone would be distorted, with smaller dots, and thus giving the final halftone an overall darker appearance than the trial halftone in FIG. 2B. which has the correct grayscale. In general, using the same spot function 34, the final halftone would result in a higher contrast than required for correct reproduction of the grayscale.

A solution to this problem is to use a modified spot function 41 in the final screen, rather than the same spot function 34 used in the trial screen. The idea is to use a spot function 41 designed such that, for a constant shade of gray as input image. the result of the final screen is the same as that for the trial screen. Since the nature of the grayscale distortion is to increase contrast, the use of a screen which decreases contrast would accomplish the desired effect.

The spot function is a function of a two-dimensional vector x representing position. A spot function signal is denoted as sf(x). $Sf_{trial}$ is the spot function for the trial screening module. $Sf_{final}$ is the spot function for the final screening module. Let the input image consist of a single shade of gray g, and let ic(g.x) denote the compensated image with correction factor, i.e. the input to the final halftone screening module, for input gray shade g at position x. Then, the final spot function, $sf_{final}(X)$, can be derived from the trial spot function, $sf_{trial}(x)$ using a simple formula:

$$sf_{final}(x) = ic(sf_{trial}(x)x)$$

Second Refinement
Reduce the Correction Factor in the Highlight and Shadow Regions The monotonicity constraint is relatively easy to satisfy in the middle of the grayscale: it is particularly difficult to satisfy in the extreme highlight and shadow regions. The purpose of the second refinement is to reduce the amplitude of the correction factor in the extreme highlight and shadow regions. thus satisfying the monotonicity constraint without requiring too low a cutoff frequency for the lowpass filter.

Figure 3:
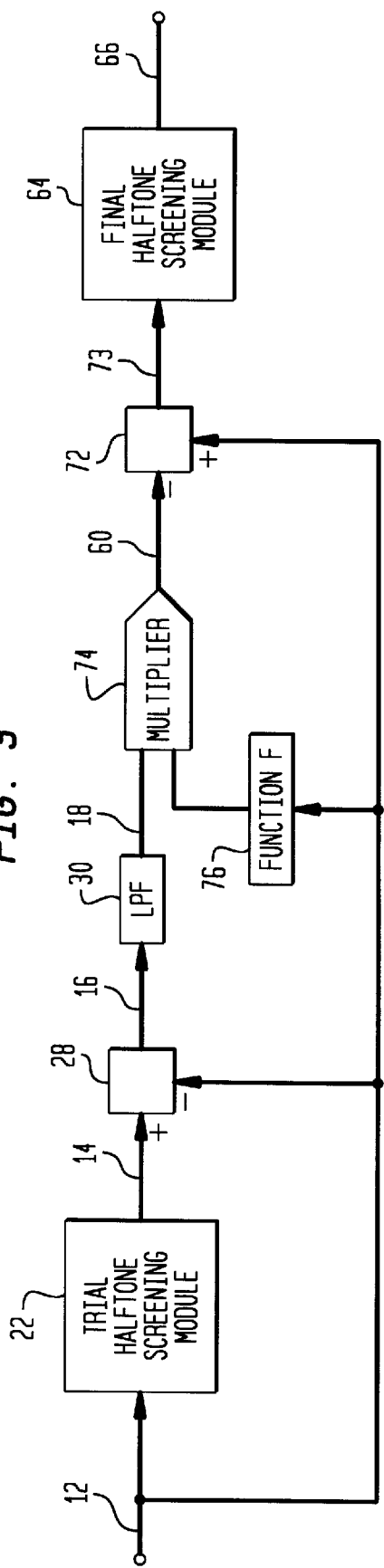
FIG. 3 is a block diagram of an alternate embodiment of a halftone screening system for suppressing moiré patterns in accordance with the present invention.

A halftone screening system with the second refinement is shown in FIG. 3. This system is essentially identical to that of FIG. 1 with the addition of a function F, 76, and a multiplier 74. The output of a multiplier is the product of its inputs. The multiplier 74 scales the moiré image 18 (the correction factor) to form a scaled moiré image 60 before being subtracted from the original image 12 in adder 72, and screened in the final halftone screening module 64. The output pixels 66 from the screening process are coupled to the marking device to form the resulting halftone image.

Figure 4:
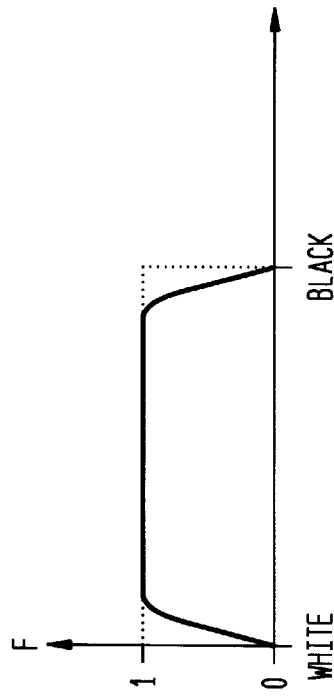
FIG. 4 is a graph of grayscale versus gain for function F in FIG. 3.

The original grayscale image is input to function F, to produce a gain signal ranging from 0 to 1 for input to multiplier 72. The curve showing the response of function F is illustrated in FIG. 4. The gain is 0 when the input is white or black, and 1 for shades of gray ranging from very light to very dark. In between, there is a smooth transition from 0 to 1 between white and very light gray, and a smooth transition from 1 to 0 between very dark gray and black. Thus, function F reduces the correction factor 18 in the grayscale regions near black and white by multiplication in multiplier 74, but does not reduce the correction factor for shades of gray in the midrange.

The effect of interposing the function F and multiplier 74 is to eliminate the correction factor 18 in areas of white and black, and reduce the correction factor 18 in areas of extreme highlights and shadow. Thus, it becomes easier to satisfy the monotonicity constraint, and therefore reproduce the entire grayscale of the input image without distortion.

Third Refinement
Reduce Moiré in the Highlight and Shadow Regions

However, reducing the amplitude of the correction signal at extreme highlights and shadow also reduces the effectiveness of the correction signal in reducing moiré in those regions. In particular, for sections of the image consisting of image detail adjacent to white (without loss of generality), much of the moiré correction signal is lost, particularly in images consisting of gray line art or text on a white background.

For example, assume that in the trial halftone the line is reproduced as lighter than its actual weight because it falls between two rows of dots. The moiré correction signal would make the grayscale image of the line and its surrounding neighborhood darker, correcting the moiré. However, the correction signal in the neighborhood of the line is eliminated because it is white, and function F for white regions of the image is zero. Thus, the moiré correction would be less effective, leaving some amount of moiré in the final halftone.

Figure 5:
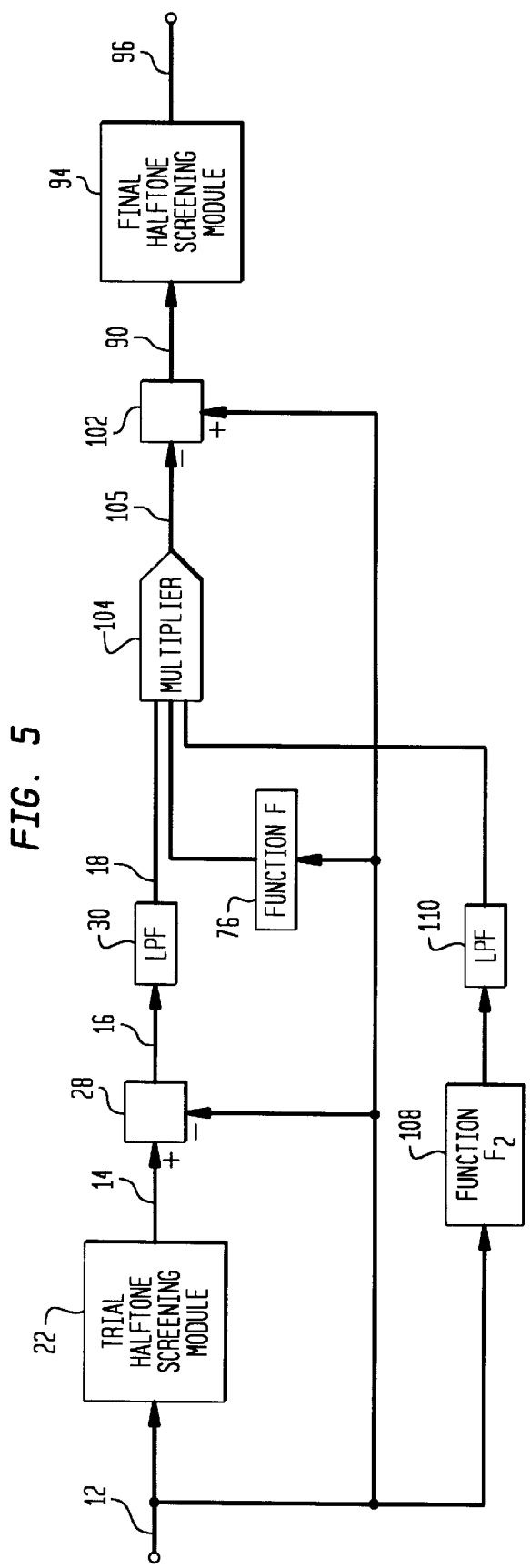
FIG. 5 is a block diagram of yet another alternate embodiment of a halftone screening system for suppressing moiré patterns in accordance with the present invention.
Figure 7:
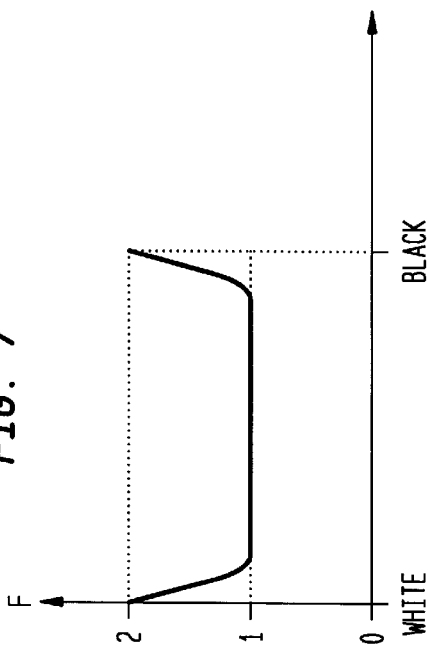
FIG. 7 is a graph of grayscale versus gain for function F2 in FIG. 5.

A halftone screening system which enhances the effectiveness of moiré suppression in the extreme highlight and shadow regions is shown in FIG. 5. The system of FIG. 5 is essentially identical to the system shown in FIG. 3, with the addition of pathway consisting of a second function F2, 108. and a second lowpass filter 110, the output of which is coupled to a third input of a three input multiplier 104, The multiplier 104 scales the moiré image 18 (the correction factor) to form a scaled moiré image 105 before being subtracted from the original image 12 in adder 102. and screened in the final halftone screening module 94. The output pixels 96 from the screening process are coupled to the marking device to form the resulting halftone image.

Figure 6:
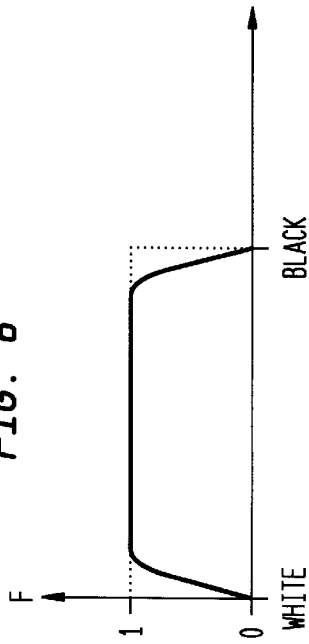
FIG. 6 is a graph of grayscale versus gain for function F in FIG. 5.

The response of the second function F2 is shown in FIG. 6. The gain is 2 when the input is white or black, and 1 for shades of gray ranging from very light to very dark. In between, there is a smooth transition in gain from 2 to 1 between white and very light gray, and a smooth transition in gain from 1 to 2 between very dark gray and black. Thus, function F2 increases the correction factor 18 in the grayscale regions near black and white by multiplication (greater than 1) in multiplier 74, but does not change the correction factor for shades of gray in the midrange.

The effect of adding function F2, LPF 110 and the third input of multiplier 104 is to make the gain depend on the local neighborhood of the input image rather than a single point. For example, for a single point surrounded by a white region, the gain is greater than one. In particular. for the specific response curve of F2 shown in FIG. 6, the output is 2.

Thus, for the example of the gray line on a white background, the moiré correction signal is amplified within the line itself, and suppressed in the neighboring white region. Ideally, the total moiré correction signal within the entire neighborhood is roughly equal to what it would have been in the basic system of FIG. 1.

In general, the combined effect of function F 76, function F2 108, lowpass filter 110. and multiplier 104 is to increase the amplitude of the moiré image 18 in image areas proximal to areas of solid black or solid white, or proximal to areas nearly solid black or solid white.

There are two advantages to the system shown in FIG. 5 over that shown in FIG. 1, in addition to making it easier to meet the monotonicity constraint. First, preventing the formation of dots in adjacent white and black areas makes the final halftone image appear cleaner, reproducing edges with higher acuity. Second, it avoids clipping artifacts resulting from adding the moiré correction factor to the image.

In the gray line on a white background example above. the line as reproduced was not dark enough. Assume now that the reproduction of the line is too dark, for example because the line coincides with a row of dots. In the basic embodiment of FIG. 1, the effect of the correction factor is to lighten the surrounding neighborhood. The line, being gray can be lightened. but the surrounding white area cannot be made any lighter than white thus reducing the effectiveness of the moiré reduction. In the embodiment of FIG. 5, removing the correction factor from the white areas and reallocating it entirely within the gray line avoids the problem of clipping altogether.

What is claimed is:

1. In a halftone screening apparatus responsive to an input image formed by a plurality of input image pixels, and providing a halftone output image formed by a plurality of screen pixels, an apparatus comprising a first halftone screening module having respective input and output nodes, said first node of said first halftone screening module being coupled to said plurality of input image pixels;

a first adder having respective first and second input nodes, and an output node, said first input node of said first adder being coupled to said output node of said first halftone screening module, said second node of said first adder being coupled to said plurality of input image pixels:

a lowpass filter having an input node coupled to said output node of said first adder, and an output node;

a second adder having respective first and second input nodes, and an output node, said second input node of said second adder being coupled to said output node of said lowpass filter, said first input node of said cord adder being coupled to said plurality of input image pixels; and a second halftone screening module having respective input and output nodes, said input node of said second halftone screening module being coupled to said output node of said second adder;

whereby said halftone output image is formed by a plurality of screen pixels at said output node of said second halftone screening module.

2. In a halftone screening apparatus responsive to an input image formed by a plurality of input image pixels, and providing a halftone output image formed by a plurality of screen pixels, an apparatus comprising:

a first halftone screening module having respective input and output nodes, said first node of said first halftone screening module being coupled to said plurality of input image pixels;

a first adder having respective first and second input nodes, and an output node, said first input node of said first adder being coupled to said output node of said first halftone screening module, said second, id node of said first adder coupled to said plurality of input image pixels;

a lowpass filter having an input node coupled to said output node of said first adder, and an output node, a function generator having an input and output node, said input node of said function generator coupled to said plurality of input image pixels;

a multiplier having respective first and second input nodes, and an output node, said first input node of said multiplier coupled to said output node of said low pass filter, said second input node of said multiplier being coupled to said output node of said function generator;

a second adder having respective first and second input nodes, and an output node, said second input node of said second adder being coupled to said output node of said multiplier, said first input node of said second adder being coupled to said plurality of input image pixels; and a second halftone screening module having respective input and output nodes, said input node of said second halftone screening module being coupled to said output node of said second adder;

wherein said function generator provides a gain of less than one when said input image is in the grayscale regions near black and white;

whereby said halftone output image is formed by a plurality of screen pixels at said output node of said second halftone screening module.

3. In a halftone screening apparatus responsive to an input image formed by a plurality of input image pixels, and providing a halftone output image formed by a plurality of screen pixels, an apparatus comprising:

a first halftone screening module having respective input and output nodes, said first node of said first halftone screening module being coupled to said plurality of input image pixels;

a first adder having respective first and second input nodes, and an output node, said first input node of said first adder being coupled to said output node of said first halftone screening module, said second node of said first adder coupled to said plurality of input image pixels:

a lowpass filter having an input node coupled to said output node of said first adder, and an output node;

a first function generator having an input and output node, said input node of said first function generator coupled to said plurality of input image pixels;

a second function generator having an input and output node, said input node of said second function generator coupled to said plurality of input image pixels;

a second lowpass filter having an input node coupled to the output node of said second function generator, and an output node;

a multiplier having respective first, second and third input nodes, and an output node, said first input node of said multiplier coupled to said output node of said first low pass filter, said second input node of said multiplier being coupled to said output node of said first function generator and said third input node coupled to the output node of said second lowpass filter;

a second adder having respective first and second input nodes, and an output node, said second input node of said second adder being coupled to said output node of said multiplier, said first input node of said second adder being coupled to said plurality of input image pixels; and a second halftone screening module having respective input and output nodes, said input node of said second halftone screening module being coupled to said output node of said second adder;

wherein said first function generator provides a gain of less than one when said input image is in the grayscale regions near black and white, and wherein said second function generator provides a gain of more than one when said input image is in the grayscale regions near black and white;

whereby said halftone output image is formed by a plurality of screen pixels at said output node of said second halftone screening module.

4. In a process for halftone screening an input image formed by a plurality of input image pixels, each said input image pixel representing the tone value for each pixel of said input image, and providing a halftone output image comprising a plurality of screen pixels, wherein each of said screen pixels corresponds to the output pixels forming the resulting halftone image, said halftone screening process comprising:

screening said plurality of input image pixels in a first halftone screen having a first screen pattern to form a first halftone screen output image;

subtracting said first halftone screen output image from said input image to form an error image, said error image including said first screen pattern and a moiré pattern resulting from said first halftone screen;

filtering said error image to substantially remove said first screen pattern to form a predicted moiré image; and combining said predicted moiré image with said input image to form a compensated image.

5. A method in accordance with claim 4, further comprising:

screening said compensated image in a second halftone screen substantially similar to said first halftone screen, the output of said second halftone screen forming said halftone output image.

6. A method in accordance with claim 4, wherein said step of combining said predicted moiré image from said input image to form a compensated image comprises subtracting said predicted moiré image from said input image.

7. A method in accordance with claim 5, wherein said first screen includes a first spot function, and said second screen includes a second spot function, wherein for a given input image, an output halftone image using said second spot function has decreased contrast relative to an output halftone image using said first spot function.

8. A method in accordance with claim 4, wherein said step of combining said predicted moiré image with said input image to form said compensated image further comprises:

forming a first function of said input image for reducing said predicted moiré image in the grayscale regions near black and white, to form a scaled predicted moiré image; and combining said scaled predicted moiré image with said input image to form said compensated image.

9. A method in accordance with claim 8, wherein said step of combining said predicted moiré image with said input image to form said compensated image further comprises:

forming said first function of said input image for reducing said predicted moiré image in the grayscale regions near black and white, while not substantially reducing said predicted moiré image for shades of gray in the midrange grayscale region.

10. A method in accordance with claim 9,
wherein said first function of said input image is 0 when said input image is white or black, and 1 when said input image is in the midrange grayscale region ranging from extreme light to extreme dark, and includes a substantially smooth transition from 0 to 1 between white and said extreme light gray, and a substantially smooth transition from 1 to 0 between said extreme dark gray and black.

11. A method in accordance with claim 8, wherein said step of combining said predicted moiré image with said input image to form said compensated image further comprises:
forming a second function of said input image for increasing said predicted moiré image in the image areas proximal to regions near black and white of said input image to form a scaled predicted moiré image.

12. A method in accordance with claim 11, further comprising:
forming said second function of said input image for increasing said predicted moiré image in the image areas proximal to grayscale regions near black and white of said input image, while not increasing said predicted moiré image for shades of gray in the midrange grayscale region, to form said scaled predicted moiré image.

13. A method in accordance with claim 12,
wherein said second function of said input image is 2 when said input image is white or black, and 1 when said input image is in the midrange grayscale region ranging from extreme light gray to extreme dark gray, and includes a substantially smooth transition from 2 to 1 between white and said extreme light gray, and a substantially smooth transition from 1 to 2 between said extreme dark gray and black.

14. In a process for halftone screening an input image formed by a plurality of input image pixels, each said input image pixel representing the tone value for each pixel of said input image, and providing a halftone output image comprising a plurality of screen pixels, wherein each of said screen pixels corresponds to the output pixels forming the resulting halftone image, said halftone screening process comprising:
predicting the moiré pattern resulting from a first halftone screen of said input image to form a predicted moiré image;
forming a first function of said input image for reducing said predicted moiré image in the grayscale regions near black and white to form a scaled predicted moiré image; and
combining said scaled predicted moiré image and said input image to form a compensated image.

15. A method in accordance with claim 14, wherein said step of combining said predicted moiré image with said input image to form said compensated image further comprises:
forming said first function of said input image for reducing said predicted moiré image in the grayscale regions near black and white, while not substantially reducing said predicted moiré image for shades of gray in the midrange grayscale region.

16. A method in accordance with claim 15,
wherein said first function of said input image is 0 when said input image is white or black, and 1 when said input image is in the midrange grayscale region ranging from extreme light to extreme dark, and includes a substantially smooth transition from 0 to 1 between white and said extreme light gray, and a substantially smooth transition from 1 to 0 between said extreme dark gray and black.

17. A method in accordance with claim 14, wherein said step of combining said predicted moiré image with said input image to form said compensated image further comprises:
forming a second function of said input image for increasing said predicted moiré image in the image areas proximal to grayscale regions near black and white of said input image to form said scaled predicted moiré image.

18. A method in accordance with claim 17, further comprising:
forming said second function of said input image for increasing said predicted moiré image in image areas proximal to grayscale regions near black and white of said input image, while not increasing said predicted moiré image for shades of gray in the midrange grayscale region, to form said scaled predicted moiré image.

19. A method in accordance with claim 18.
wherein said second function of said input image is 2 when said input image is white or black, and 1 when said input image is in the midrange grayscale region ranging from extreme light gray to extreme dark gray, and includes a substantially smooth transition from 2 to 1 between white and said extreme light gray, and a substantially smooth transition from 1 to 2 between said extreme dark gray and black.

20. A method in accordance with claim 14, wherein said step of predicting the moiré pattern resulting from said first halftone screen of said input image to form said predicted moiré image comprises:
screening said plurality of input image pixels in a first halftone screen having a first screen pattern to form a first halftone screen output image;
subtracting said first halftone screen output image from said input image to form an error image, said error image including said first screen pattern and a moiré pattern resulting from said first halftone screen; and
filtering said error image to substantially remove said first screen pattern to form said predicted moiré image.

21. A method in accordance with claim 14, wherein said step of combining said scaled predicted moiré image with said input image to form said compensated image comprises:
multiplying said predicted moiré image with said first function to form said scaled moiré image; and
subtracting said scaled moiré image from said input image.

22. A method in accordance with claim 14, further comprising:
screening said compensated image in a second halftone screen substantially similar to said first halftone screen, the output of said second halftone screen forming said halftone output image.

23. A method in accordance with claim 22, wherein said first halftone screen includes a first spot function, and said second screen includes a second spot function, wherein for a given input image, an output halftone image using said second spot function has decreased contrast relative to an output halftone image using said first spot function.

24. In a process for halftone screening an input image formed by a plurality of input image pixels, each said input image pixel representing the tone value for each pixel of said input image. and providing a halftone output image comprising a plurality of screen pixels, wherein each of said screen pixels corresponds to the output pixels forming the resulting halftone image, said halftone screening process comprising:

predicting the moiré pattern resulting from a first halftone screen of said input image to form a predicted moiré image;

forming a first function of said input image for reducing said predicted moiré image in the grayscale regions near black and white, while not substantially reducing said predicted moiré image for shades of gray in the midrange grayscale region;

forming a second function of said input image for increasing said predicted moiré image in the image areas proximal to grayscale regions near black and white of said input image. while not substantially increasing said predicted moiré image for shades of gray in the midrange grayscale region;

combining said predicted moiré image with said first function, said second function and said input image to form a compensated image.

25. A method in accordance with claim 24, wherein said step of predicting the moiré pattern resulting from said first halftone screen of said input image to form said predicted moiré image comprises:

screening said plurality of input image pixels in a first halftone screen having a first screen pattern to form a first halftone screen output image;

subtracting said first halftone screen output image from said input image to form an error image, said error image including said first screen pattern and a moiré pattern resulting from said first halftone screen; and filtering said error image to substantially remove said first screen pattern to form said predicted moiré image.

26. A method in accordance with claim 24, wherein said step of combining said predicted moiré image with said first function, said second function and said input image to form said compensated image comprises:

multiplying said predicted moiré image with first function and with said second function to form a scaled moiré image. and subtracting said scaled moiré image from said input image.

27. A method in accordance with claim 24, further comprising:

screening said compensated image in a second halftone screen substantially similar to said first halftone screen, the output of said second halftone screen forming said halftone output image.

28. A method in accordance with claim 27, wherein said first halftone screen includes a first spot function, and said second screen includes a second spot function, wherein for a given input image, an output halftone image using said second spot function has decreased contrast relative to an output halftone image using said first spot function.

29. In an apparatus for halftone screening an input image formed by a plurality of input image pixels, each said input image pixel representing the tone value for each pixel of said input image, and providing a halftone output image comprising a plurality of screen pixels, wherein each of said screen pixels corresponds to the output pixels forming the resulting halftone image, said halftone screening apparatus comprising:

means for screening said plurality of input image pixels in a first halftone screen having a first screen pattern to form a first halftone screen output image;

means for subtracting said first halftone screen output image from said input image to form an error image, said error image including said first screen pattern and a moiré pattern resulting from said first halftone screen, means for filtering said error image to substantially remove said first screen pattern to form a predicted moiré image; and means for combining said predicted moiré image with said input image to form a compensated image.

30. An apparatus in accordance with claim 29, further comprising:

means for screening said compensated image in a second halftone screen substantially similar to said first halftone screen, the output of said second halftone screen forming said halftone output image.

31. An apparatus in accordance with claim 29, wherein said means for combining said predicted moiré image from said input image to form a compensated image comprises subtracting said predicted moiré image from said input image.

32. An apparatus in accordance with claim 30, wherein said first screen includes a first spot function, and said second screen includes a second spot function, wherein for a given input image, an output halftone image using said second spot function has decreased contrast relative to an output halftone image using said first spot function.

33. An apparatus in accordance with claim 29, wherein said means for combining said predicted moiré image with said input image to form said compensated image further comprises:

means for forming a first function of said input image for reducing said predicted moiré image in the grayscale regions near black and white, to form a scaled predicted moiré image; and means for combining said scaled predicted moiré image with said input image to form said compensated image.

34. An apparatus in accordance with claim 33, wherein said means for combining said predicted moiré image with said input image to form said compensated image further comprises:

means for forming said first function of said input image for reducing said predicted moiré image in the grayscale regions near black and white, while not substantially reducing said predicted moiré image for shades of gray in the midrange grayscale region.

35. An apparatus in accordance with claim 34, means for wherein said first function of said input image is 0 when said input image is white or black, and 1 when said input image is in the midrange grayscale region ranging from extreme light to extreme dark, and includes a substantially smooth transition from 0 to 1 between white and said extreme light gray, and a substantially smooth transition from 1 to 0 between said extreme dark gray and black.

36. An apparatus in accordance with claim 33, wherein said means for combining said predicted moiré image with said input image to form said compensated image further comprises:

means for forming a second function of said input image for increasing said predicted moiré image in the image areas proximal to grayscale regions near black and white of said input image to form a scaled predicted moiré image.

37. An apparatus in accordance with claim 36, further comprising:
  means for forming said second function of said input image for increasing said predicted moiré image in the image areas proximal to grayscale regions near black and white of said input image, while not increasing said predicted moiré image for shades of gray in the midrange grayscale region, to form said scaled predicted moiré image.

38. An apparatus in accordance with claim 37, means for wherein said second function of said input image is 2 when said input image is white or black, and 1 when said input image is in the midrange grayscale region ranging from extreme light gray to extreme dark gray, and includes a substantially smooth transition from 2 to 1 between white and said extreme light gray, and a substantially smooth transition from 1 to 2 between said extreme dark gray and black.

39. In an apparatus for halftone screening an input image formed by a plurality of input image pixels, each said input image pixel representing the tone value for each pixel of said input image, and providing a halftone output image comprising a plurality of screen pixels, wherein each of said screen pixels corresponds to the output pixels forming the resulting halftone image, said halftone screening apparatus comprising:
  means for predicting the moiré pattern resulting from a first halftone screen of said input image to form a predicted moiré image;
  means for forming a first function of said input image for reducing said predicted moiré image in the grayscale regions near black and white to form a scaled predicted moiré image; and
  means for combining said scaled predicted moiré image and said input image to form a compensated image.

40. An apparatus in accordance with claim 39, wherein said means for combining said predicted moiré image with said input image to form said compensated image further comprises:
  means for forming said first function of said input image for reducing said predicted moiré image in the grayscale regions near black and white, while not substantially reducing said predicted moiré image for shades of gray in the midrange grayscale region.

41. An apparatus in accordance with claim 40, means for wherein said first function of said input image is 0 when said input image is white or black, and 1 when said input image is in the midrange grayscale region ranging from extreme light to extreme dark, and includes a substantially smooth transition from 0 to 1 between white and said extreme light gray, and a substantially smooth transition from 1 to 0 between said extreme dark gray and black.

42. An apparatus in accordance with claim 39, wherein said means for combining said predicted moiré image with said input image to form said compensated image further comprises:
  means for forming a second function of said input image for increasing said predicted moiré image in the image areas proximal to grayscale regions near black and white of said input image to form said scaled predicted moiré image.

43. An apparatus in accordance with claim 42, further comprising:
  means for forming said second function of said input image for increasing said predicted moiré image in the image areas proximal to grayscale regions near black and white of said input image, while not increasing said predicted moiré image for shades of gray in the midrange grayscale region, to form said scaled predicted moiré image.

44. An apparatus in accordance with claim 43,
  means for wherein said second function of said input image is 2 when said input image is white or black, and 1 when said input image is in the midrange grayscale region ranging from extreme light gray to extreme dark gray, and includes a substantially smooth transition from 2 to 1 between white and said extreme light gray, and a substantially smooth transition from 1 to 2 between said extreme dark gray and black.

45. An apparatus in accordance with claim 39, wherein said means for predicting the moiré pattern resulting from said first halftone screen of said input image to form said predicted moiré image comprises:
  means for screening said plurality of input image pixels in a first halftone screen having a first screen pattern to form a first halftone screen output image.
  means for subtracting said first halftone screen output image from said input image to form an error image, said error image including said first screen pattern and a moiré pattern resulting from said first halftone screen; and
  means for filtering said error image to substantially remove said first screen pattern to form said predicted moiré image.

46. An apparatus in accordance with claim 39, wherein said means for combining said scaled predicted moiré image with said input image to form said compensated image comprises:
  means for multiplying said predicted moiré image with said first function to form said scaled moiré image; and
  means for subtracting said scaled moiré image from *said input image.

47. An apparatus in accordance with claim 39, further comprising:
  means for screening said compensated image in a second halftone screen substantially similar to said first halftone screen, the output of said second halftone screen forming said halftone output image.

48. An apparatus in accordance with claim 47, wherein said first halftone screen includes a first spot function, and said second screen includes a second spot function, wherein for a given input image, an output halftone image using said second spot function has decreased contrast relative to an output halftone image using said first spot function.

49. In an apparatus for halftone screening an input image formed by a plurality of input image pixels, each said input image pixel representing the tone value for each pixel of said input image, and providing a halftone output image comprising a plurality of screen pixels, wherein each of said screen pixels corresponds to the output pixels forming the resulting halftone image, said halftone screening apparatus comprising:
  means for predicting the moiré pattern resulting from a first halftone screen of said input image to form a predicted moiré image.
  means for forming a first function of said input image for reducing said predicted moiré image in the grayscale regions near black and white, while not substantially reducing said predicted moiré image for shades of gray in the midrange grayscale region;
  means for forming a second function of said input image for increasing said predicted moiré image in the image areas proximal to grayscale regions near black and white of said input image, while not substantially increasing said predicted moiré image for shades of gray in the midrange grayscale region;

means for combining said predicted moiré image with said first function, said second function and said input image to form a compensated image.

50. An apparatus in accordance with claim 49, wherein said means for predicting the moiré pattern resulting from said first halftone screen of said input image to form said predicted moiré image comprises:

means for screening said plurality of input image pixels in a first halftone screen having a first screen pattern to form a first halftone screen output image;

means for subtracting said first halftone screen output image from said input image to form an error image, said error image including said first screen pattern and a moiré pattern resulting from said first halftone screen; and means for filtering said error image to substantially remove said first screen pattern to form said predicted moiré image.

51. An apparatus in accordance with claim 49, wherein said means for combining said predicted moiré image with said first function, said second function and said input image to form said compensated image comprises:

means for multiplying said predicted moiré image with first function and with said second function to form a scaled moiré image; and means for subtracting said scaled moiré image from said input image.

52. An apparatus in accordance with claim 49, further comprising:

means for screening said compensated image in a second halftone screen substantially similar to said first halftone screen the output of said second halftone screen forming said halftone output image.

53. An apparatus in accordance with claim 52, wherein said first halftone screen includes a first spot function, and said second screen includes a second spot function, wherein for a given input image, an output halftone image using said second spot function has decreased contrast relative to an output halftone image using said first spot function.

* * * * *